United States Patent [19]

Behr et al.

[11] Patent Number: 4,781,734
[45] Date of Patent: Nov. 1, 1988

[54] NON-POROUS HYDROGEN DIFFUSION MEMBRANE AND UTILIZATION THEREOF

[75] Inventors: Friedrich Behr, Essen; Bernd Kugler, Aachen; Michael Pietsch, Kall; Walter Weirich, Aachen, all of Fed. Rep. of Germany

[73] Assignee: Kernforschungsanlage Julich Gesellschaft mit beschrankter Haftung, Julich, Fed. Rep. of Germany

[21] Appl. No.: 477,217

[22] Filed: Mar. 21, 1983

[30] Foreign Application Priority Data

Mar. 26, 1982 [DE] Fed. Rep. of Germany ....... 3211193

[51] Int. Cl.⁴ .......................................... B01D 53/22
[52] U.S. Cl. .......................................... 55/16; 55/68; 55/158
[58] Field of Search ............................. 55/16, 68, 158; 420/417, 501

[56] References Cited

U.S. PATENT DOCUMENTS

| 1,024,476 | 4/1912 | Rossi ................... 420/501 |
| 1,025,426 | 5/1912 | Rossi ................... 420/501 |
| 1,174,631 | 3/1916 | Snelling ............... 55/16 X |
| 2,163,224 | 6/1939 | Alexander ............ 420/501 X |
| 2,388,095 | 10/1945 | Stahly ................. 55/16 |
| 2,766,113 | 10/1956 | Chisholm et al. ..... 420/417 X |
| 3,359,705 | 12/1967 | Mullhaupt ............ 55/16 |
| 3,407,571 | 10/1968 | Sherwood ............ 55/158 |
| 3,509,694 | 5/1970 | Imai et al. ........... 55/16 |
| 3,847,672 | 11/1974 | Trocciola et al. .... 55/16 X |
| 3,940,912 | 3/1976 | Buchner .............. 55/16 |
| 3,957,534 | 5/1976 | Linkohr et al. ...... 55/158 X |
| 4,110,425 | 8/1978 | Buhl et al. ........... 55/16 X |
| 4,268,278 | 5/1981 | Dobo et al. .......... 55/16 |

FOREIGN PATENT DOCUMENTS

| 2823521 | 12/1979 | Fed. Rep. of Germany ......... 55/16 |
| 2854682 | 6/1980 | Fed. Rep. of Germany ......... 55/16 |

Primary Examiner—Robert Spitzer
Attorney, Agent, or Firm—Scully, Scott, Murphy & Presser

[57] ABSTRACT

A non-porous hydrogen diffusion membrane, and the utilization thereof for the separation of hydrogen from gas mixtures. The non-porous hydrogen diffusion membrane distinguishes itself in that it is constituted of TiNi or TiAg with an atom ratio of about 1:1. These titanium alloys presently contain about 45 to 55% of atoms of one or the other of the components and are utilized at temperatures in excess of 300° C. in the form of thin sheets of foils.

3 Claims, 1 Drawing Sheet

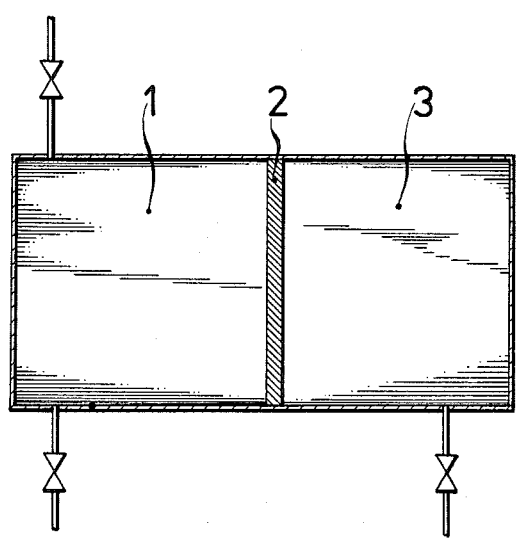

NON-POROUS HYDROGEN DIFFUSION MEMBRANE AND UTILIZATION THEREOF

BACKGROUND OF THE INVENTION

1. Field of the Invention

The present invention relates to a non-porous hydrogen diffusion membrane, and to the utilization thereof for the separation of hydrogen from gas mixtures.

2. Discussion of the Prior Art

The separation of hydrogen from gas mixtures is known based on diffusion through a diffusion membrane or diffusion wall which is constituted of palladium. Presently known are also diffusion walls which are constituted of other hydrogen-permeable materials, which are coated with palladium or palladium alloys on only the gas inlet side; in effect, on the side which is exposed to the gas mixture. Thus, for example, pursuant to U.S. Pat. No. 3,407,571 there are employed diffusion walls which are formed, for instance, of steel, and which are coated on the primary side with a thin palladium layer or palladium alloy such as, for example, a palladium-silver alloy containing up to about 60% of silver. In order to accelerate the diffusion, such walls should be especially employed at an elevated temperature, which can reach up to about 820° C., wherein temperatures are preferred in the range of about 150° to 260° C. Furthermore, there should be particularly maintained a pressure differential between the primary and secondary side, which lies at least at about 1 bar, and preferably can extend up to about 100 bar.

In accordance with the disclosure of U.S. Pat. No. 1,174,631, the separation of hydrogen from gas mixtures can be carried out continuously and especially economically by means of diffusion through a platinum or palladium wall having a porous ceramic substrate, wherein the hydrogen which has been released after diffusion is then conveyed off.

In the practical implementation of such processes for the separation of hydrogen by means of diffusion through non-porous partition walls, which are permeable only to hydrogen, difficulties are encountered particularly during operation at elevated temperatures, and with the separation in the form of light hydrogen or its isotopes, such as would, for example, be encountered in the primary cooling gas of a nuclear reactor; inasmuch as over lengthier time periods some minor contamination of the primary or secondary chambers themselves with vapor or oxidized compounds will lead to disturbances; such as oxide layer formations (particularly on the secondary side) with a corresponding retardant effect on the diffusion or a generally negative influence on the diffusion processes; and, moreover, the palladium-contained layers further tend at an elevated temperature present over lengthier time periods, to diffuse into the substrate so that the desired protective and disassociation effect will reduce with time. Pure palladium foils or foils homogenously containing palladium supported on a porous substrate must be constructed relatively thick, in order to be able to withstand the pressure differential encountered between the primary and the secondary side. This also fails to provide an inexpensive solution with respect to savings in the costs of the materials. Heavily constructed palladium-containing foils are, for the remainder, even more poorly suited for hydrogen diffusion than are thicker foils constituted of other materials.

SUMMARY OF THE INVENTION

Accordingly, it is an object of the present invention to provide for the preparation of a novel metallic membrane material for the separation of hydrogen from mixtures, which facilitates an effective permeation and whose separating effect is maintained even over lengthier operating periods without the need to at all employ any noble metals from the platinum group for the partition walls.

The foregoing object is achieved in accordance with the present invention through a non-porous hydrogen diffusion membrane which distinguishes itself in that it is constituted of TiNi or TiAg with an atom ratio of about 1:1.

These titanium alloys presently contain about 45 to 55% of atoms of one or the other of the components and are utilized at temperatures in excess of 300° C. in the form of thin sheets of foils.

Such foils can be obtained, for example, in accordance with the known method for the processing of amorphous metals (see "Tech. Mitt. Krupp. Forsch.-Ber." Volume 40 (1982) Section 3, pages 67–71), in which the readily superheated smelt which is produced under a protective gas is sprayed from a slot or linear nozzle onto a rapidly rotating (about 30 to 40 m/s) copper roll at room temperature. In this manner, there can be produced thin membranes of a thickness as low as about 25 to 50 μm. Laboratory experiments have been carried out with discs of up to about 100 to 200 μm in thickness, which are cut from cast blocks with a diamond saw and through sparking off and/or etching can be reduced to the desired thickness. Through warm rolling there are obtained foils of down to about 3 mm in thickness which, in accordance with contemplated requirements, can still be emlloyed for effectuating the hydrogen diffusion.

The above-mentioned TiNi or TiAg alloys distinguish themselves through the following advantageous properties:

(1) they are not brittle, so that there can be produced flexible sheets or foils, which will not embrittle even during protractcd use;

(2) their permeation rates are advantageous, similar to those formed of palladium and its alloys;

(3) the hydrogen takeup will not be suppressed because of the concurrent presence of different contaminants in the gas even during lengthier operating periods.

The equilibrium diagrams of the systems Ti/Ni and Ti/Ag teach that these alloys evidence a homogeneity range at an atom ratio of about 1:1. Within this range the alloys are not brittle, but are flexible and deformable.

Contaminants up to about 0.5% will not be disruptive.

It has now be found that these alloys will spontaneously activate in hydrogen gas mixtures, which contain nitrogen, water and carbon compounds, at an elevated temperature, so that the hydrogen molecule will disassociate and H will diffuse at similar diffusion rates through the membrane as in the case of palladium-containing membranes. This activation of the surface remains maintained permanently.

Thus, for example, a membrane constituted of TiNi was subjected at the primary side to an $H_2$ gas mixture consisting of hydrogen, $CO_2$ and nitrogen at 400° C. After an initial reduction in the permeation, after already a short period there were again obtained hydrogen permeation rates, which corresponded to those of pure H₂ on the primary side at the same partial pressure. The rates then remained constant over a period of a number of weeks up to the end of the experiment.

For titanium-silver (1:1) there was found to be a similar behavior, wherein the permeation rates were greater than those for pure palladium.

The inventive diffusion membranes were employed for the separation of hydrogen from gas mixtures at temperatures in excess of 300° C.; namely the TiNi-membrane can be used at hydrogen partial pressure of up to ~30 bar, which can be suitably low. Intentionally an H₂ pressure dropoff of ≧10, in particular of about 1:10 up to about 1:100, is maintained between the primary and the secondary side.

Such a pressure dropoff can be achieved through aspiration of the separated hydrogen on the secondary side or also in that the hydrogen is caught on the secondary side through reaction with a reaction partner and then conducted off. Hereby, shown as being suitable for this purpose have been hydride-containing smelts of alkali and/or earth alkali metals, or of their mixtures.

The usual membrane thicknesses lie between about 10 μ and about 1 to 2 mm.

TiAg, due to its satisfactory mechanical properties and particularly high permeation rates is attractive within ranges wherein no high hydrogen partial pressures come into play, so that there can be avoided the formation of a hydride phase. Due to this reason, there are utilized TiAg membranes at hydrogen partial pressures of more than about 10 torr only in the temperature range of in excess of about 600° C. At 300° C. the hydrogen partial pressure must be maintained below about $10^{-2}$ torr. Through equilibrium measurements there was ensured that in the system TiNi, even at higher hydrogen partial pressures of a number of bars, no hydride phase was formed.

BRIEF DESCRIPTION OF THE ILLUSTRATED EMBODIMENT

The enclosed drawing schematically illustrates an arrangement for the separation of hydrogen from a gas mixture which is introduced into the chamber 1. The hydrogen diffuses through the non-porous membrane 2 formed of TiNi or TiAg and having a titanium component of from about 45 to about 55 percent of atoms into the chamber 3 from which it is aspirated or conducted off.

While there has been shown and described what are considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method for the separation of hydrogen from gas mixtures containing hydrogen comprising contacting the primary side of a non-porous hydrogen diffusion membrane with said gas mixture, said membrane being formed of TiAg and having a titanium component of from about 45 to 55% of atoms, said separation being conducted at about 600° C. in a hydrogen partial pressure range of about 10 torr.

2. Apparatus for the separation of hydrogen from a gas mixture containing hydrogen comprising a first chamber and a second chamber, said first chamber and said second chamber being separated by a membrane, said membrane being formed of TiAg and having a titanium component of from about 45 to about 55% of atoms.

3. Non-porous hydrogen diffusion membrane, said membrane being formed of TiAg, and having a titanium component of about 45 to 55% to atoms.

* * * * *